Sept. 3, 1968  U. TSAO  3,399,512
PURIFICATION PROCESS
Filed April 13, 1966

INVENTOR
Utah Tsao
BY *Marn & Jangarathis*
ATTORNEYS

United States Patent Office 3,399,512
Patented Sept. 3, 1968

3,399,512
PURIFICATION PROCESS
Utah Tsao, Jersey City, N.J. (% The Lummus Co.,
385 Madison Ave., New York, N.Y. 10017)
Filed Apr. 13, 1966, Ser. No. 542,317
5 Claims. (Cl. 55—50)

ABSTRACT OF THE DISCLOSURE

A process for reducing the content of volatile components in a liquefied gas product wherein the liquefied product is contacted with the gaseous feed to the liquefaction zone, containing a higher concentration of the more volatile component, followed by separating the liquefied product, now containing a reduced content of the more volatile component, from the gaseous feed. The process is particularly adapted to removing a volatile component, such as carbon dioxide, from liquefied chlorine.

---

This invention relates to a method for reducing the quantity of more volatile components of a gaseous mixture, and more particularly relates to a method for reducing the quantity of hydrogen, nitrogen, oxygen and carbon dioxide contained as impurities in chlorine gas which is subsequently liquefied.

Chlorine is commonly produced by the electrolysis of brine which is available in large quantities throughout the United States. The gas from an electrolytic cell in addition to containing chlorine, also contains water and minor quantities of more volatile components, such as hydrogen, nitrogen, oxygen and carbon dioxide. Such components or impurities may be generally tolerated in the product liquefied chlorine, however, the demand for chlorine with reduced amounts of such components or impurities has substantially increased to the point where the carbon dioxide content of liquefied chlorine produced by known processes is excessive.

To prepare liquefied chlorine from the gaseous chlorine obtained from an electrolytic cell having carbon electrodes, the gaseous chlorine after removal of a major portion of the water vapor, is compressed and supercooled to a temperature below the saturation temperature of chlorine at the prevailing pressure. Current techniques do not include procedures for reducing or removing carbon dioxide which is formed during electrolysis of the brine. Minor quantities of water vapor are also present which are passed through the compression and cooling steps with concomitant condensation of water which results in corrosion of the condensing surfaces and the subsequent need to replace the condensing surfaces. The carbon dioxide content of liquefied chlorine is generally in the range of from 2000 to 4000 p.p.m., which amount is excessive for use in processes for the chlorination of hydrocarbon where carbon dioxide is deleterious to the yields, such as in the preparation of vinyl chloride. Also, in processes for the preparation of sodium hypochlorite, carbon dioxide contained in the chlorine reactant stream will result in the formation of sodium carbonate.

An object of this invention is to provide a method for reducing the quantities of more volatile components contained in a gaseous stream.

Another object of the invention is to provide a method for reducing the quantities of more volatile components contained in a gaseous stream which is subsequently liquefied.

Still another object of the invention is to provide a method for reducing the quantities of more volatile components in liquefied chlorine formed from chlorine gas produced by the electrolysis of brine.

A further object of the invention is to provide a method for reducing the refrigeration requirement in a process for forming liquefied products having reduced quantities of more volatile components from a gas containing such more volatile components.

A still further object of the invention is to provide a method for reducing the corrosion of condensing surfaces in a process for forming liquefied products from a gaseous mixture.

Further objects and advantages will become apparent from the following discussion when taken with the accompanying drawing wherein like numbers designate like parts throughout and wherein.

To facilitate an understanding of the invention, the following description is directed to the removal and/or reduction of hydrogen, nitrogen, oxygen and carbon dioxide in a chlorine gas containing such compounds as impurities.

Briefly in accordance with the invention, a compressed chlorine gas including as impurities minor quantities of more volatile components is contacted with liquefied chlorine having a reduced quantity of such compounds. A gaseous chlorine stream is withdrawn from such contact and is passed to a condenser wherein a major portion of such gaseous chlorine stream is condensed to form the liquefied chlorine having a reduced quantity of such compounds. Such condensed or liquefied chlorine constitutes the liquefied chlorine which contacts the compressed chlorine gaseous stream. Substantially all of the hydrogen and air (as oxygen and nitrogen), and a major portion of the carbon dioxide are not condensed and are vented from the condensing step. The liquefied chlorine remaining after contact of the liquefied chlorine and compressed chlorine gas is recovered as product and passed to storage.

During contact of the liquefied chlorine with the gaseous chlorine stream, a major portion of the water vapor in the gaseous chlorine (after drying) will be withdrawn with the net product liquefied chlorine. In this manner a negligible amount of water vapor will be passed into the condenser thereby reducing the possibility of corrosion in such condenser. Since the gaseous chlorine stream must be cooled to a temperature below the saturation temperature of chlorine at the prevailing pressure and since the resulting condensed or liquefied chlorine is admixed with the gaseous chlorine feed with a corresponding reduction in temperature of the gaseous phase, the refrigeration requirements for condensation are significantly reduced as will become more apparent from the following description.

Figure 1:
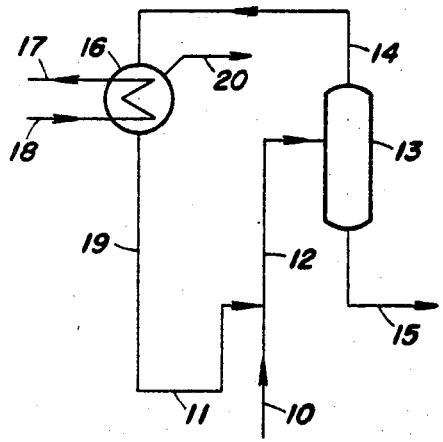
FIGURE 1 is a schematic flow diagram of one embodiment of the invention.

Referring now to FIGURE 1 of the drawing, a compressed chlorine gas in line 10 containing minor quantities of more volatile components including air (as oxygen and nitrogen), hydrogen and carbon dioxide is admixed with liquefied chlorine in line 11, and passed through line 12 to tank 13. In tank 13, the combined stream is separated into a cooler gaseous overhead in line 14 and into a liquefied chlorine withdrawn as product in line 15. The liquefied product in line 15 is passed to a storage tank (not shown). As a result of such contact, the gaseous overhead in line 14 has a greater concentration of the more volatile components as compared with their concentration in the gaseous feed in line 10. The gaseous overhead in line 14 is passed to a condenser 16 wherein a major portion of such gaseous stream is condensed. A cooled intermediate heat transfer fluid in line 17 is passed through the tube side of condenser 16 in indirect heat transfer relationship to the gaseous stream in line 14, and thereafter withdrawn through line 18 and passed to a suitable cooling means (not shown) to recool such intermediate heat transfer fluid. The temperature to which the gaseous stream is cooled is below the saturation temperature of chlorine at the prevailing pressure.

The condensate or liquefied chlorine withdrawn in line 11 from condenser 16 is comprised of a quantity of chlorine equal to or greater than the amount of chlorine withdrawn as product from tank 13 through line 15 depending on the degree of subcooling effected in condenser 16. Since air, hydrogen and carbon dioxide have a lower boiling point than chlorine at the prevailing pressure to which the feed in line 10 is compressed, substantially all of such components remain in the gaseous phase and are withdrawn in line 20 together with a minor amount of uncondensed chlorine. The uncondensed gases in line 20 may be passed to a second condenser (not shown) to recover additional quantities of liquefied chlorine.

Generally, a pump is required to pass the liquefied chlorine to storage, however, in the embodiment of FIGURE 1, such a pump is not required provided that there is a vertical height of at least five feet from the point of contact between the feed in line 10 and the liquefied chlorine in line 11, and the bottom of the condenser 16. By having such a vertical height, the compressed chlorine gas in line 10 is employed to lift the liquefied chlorine in line 11 to the tank 13.

Figure 2:
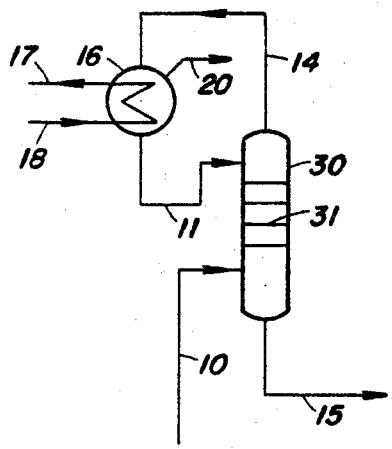
FIGURE 2 is a schematic flow diagram of another embodiment of the invention.

In the embodiment of FIGURE 2, there is provided a tower 30 including vapor-liquid contact means 31, such as sieve trays. In accordance with this embodiment, the compressed chlorine gaseous feed in line 10 is introduced into the tower 30 and passed in countercurrent contact with liquefied chlorine introduced into tower 30 through line 11. A gaseous overhead in line 14 is withdrawn from the tower 30 and is passed to condenser 16 which is cooled by passage of a refrigerated intermediate heat transfer fluid introduced through line 17 and withdrawn through line 18. Uncondensed gases containing substantially all of the more volatile components are withdrawn from condenser 16 is passed through line 11 to tower 30 and passed in countercurrent contact with the gaseous feed in line 10. Liquefied chlorine is withdrawn as product in line 15 from the tower 30 and passed to a storage tank (not shown). In the embodiment of FIGURE 2 as with the embodiment of FIGURE 1, the quantity of chlorine condensed in condenser 16 is equal or greater than the quantity of liquefied chlorine removed from tower 30 as product in line 15, depending upon the degree of subcooling.

Figure 3:
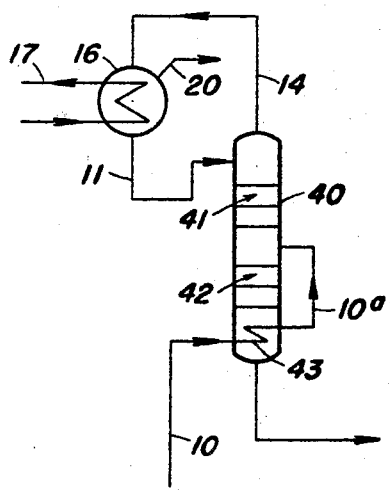
FIGURE 3 is a schematic flow diagram of still another embodiment of the invention.

With reference to the embodiment of FIGURE 3, there is provided a tower 40 including a rectifying zone and a stripping zone, generally indicated as 41 and 42, respectively. The gaseous feed in line 10 is first passed through a heat exchange coil 43 located in the lower portion of the tower 40 below stripping zone 42 to provide the reboil requirements for the tower 40. The partially cooled feed is thereafter passed through line 10a and introduced into the tower 40 intermediate the rectifying zone 41 and the stripping zone 42. The gaseous feed is passed in countercurrent contact with the liquefied stream in line 11 introduced into tower 40 above the rectifying zone 41.

A gaseous overhead in line 14 is passed to condenser 16 wherein a major portion of such gaseous stream is condensed by passage in indirect heat transfer relationship with a cooled intermediate heat transfer fluid introduced into condenser 16 through line 17 and withdrawn through line 18. The uncondensed gases are withdrawn from condenser 16 through line 20 and contain substantially all of the more volatile components contained in the gaseous chlorine feed to the tower 40.

In the stripping zone 42 of the tower 40, the liquid chlorine is stripped with vapors formed by passing the gaseous chlorine feed in line 10 through reboiler 43 since the temperature of the gaseous chlorine feed in line 10 is higher than the temperature of the liquefied chlorine. The more volatile components will be stripped from the liquefied stream passing through the stripping zone 42. A liquefied chlorine product is withdrawn as tower bottoms through line 15 and passed to a storage unit (not shown).

Similarly, as in the case of the embodiments of FIGURES 1 and 2, the quantity of chlorine condensed in condenser 16 is equal to or greater than the quantity of liquefied chlorine withdrawn as product through line 15. The embodiment of FIGURE 3 would substantially eliminate the more volatile components from the liquefied chlorine product.

While the application of the invention may be varied widely, particularly with respect to the pressure to which the gaseous chlorine is compressed and the corresponding saturation temperature, the following example will serve to illustrate the present invention with particular reference to FIGURE 1.

*Example*

Electrolytic chlorine in line 10 at a pressure of 45 p.s.i.g. and at a temperature of 100° F. is combined with liquefied chlorine in line 11 at a temperature of 10° F. and is introduced into tank 13 through line 12. The analysis of the components of the various lines are set forth in Table 1 below.

TABLE 1.—ANALYSIS OF COMPONENTS OF THE STREAMS

| Components | Pounds/hour | | | | |
| --- | --- | --- | --- | --- | --- |
| Stream | Line 10 | Line 14 | Line 11 | Line 20 | Line 15 |
| $Cl_2$ | 15,225 | 15,225 | 13,684 | 1541.0 | 13,684 |
| $H_2$ | 2.0 | 2.0 | | 2.0 | Trace |
| $CO_2$ | 57.0 | 77.4 | 27.4 | 51.2 | 6.8 |
| Air | 58.0 | 58.0 | | 58.0 | Trace |
| Total | 15,342.0 | 15,362.4 | 13,711.4 | 1652.2 | 13,690.8 |

The combined stream is separated into liquefied chlorine in line 15 and a gaseous overhead in line 14. The liquefied chlorine in line 15 at a temperature of 33° F. is withdrawn as product from the tank 13 through line 15. The gaseous overhead at a temperature of 54° F. is passed to condenser 16 wherein a condensing temperature of 10° F. is maintained by passage of an intermediate heat transfer fluid. Substantially all of the more volatile components of the gaseous stream introduced into the condenser 16 is withdrawn through line 20 whereas only a minor portion of such components are withdrawn in the liquefied chlorine withdrawn through line 11.

The quantity of carbon dioxide in the product liquefied chlorine, i.e. 500 p.p.m. is substantially less than the quantity of carbon dioxide, i.e. 2000 to 4000 p.p.m. of processes presently utilized for liquefying chlorine. Since the gaseous feed is cooled during contact with the cooled liquefied stream, the refrigeration requirements of the condenser are reduced as compared with present processing techniques.

While the invention has been described with reference to the removal of hydrogen, nitrogen, oxygen and carbon dioxide from a gaseous chlorine stream to provide liquefied chlorine having reduced concentration of such components or impurities, the invention is equally applicable for the removal of more volatile components from other gaseous streams. For instance, the invention may be utilized to purify carbon dioxide containing minor quantities of nitrogen, hydrogen and methane. Similarly, the invention may be utilized to remove hydrogen and nitrogen from ammonia where such compounds are present as impurities.

While preferred embodiments of the present invention have been shown and described, it is understood that the same is not limited thereto, but is susceptible of changes and modifications within the spirit and scope of the present invention, and it is therefore intended to cover all such changes and modifications as are encompassed by the scope of the intended claims.

What is claimed is:

1. A process for reducing the content of a more volatile component(s) in a liquefied gas product from a liquefaction process comprising:
   (a) contacting the liquefied gas from a liquefaction zone, containing the more volatile component(s) therein, with a gaseous feed to the liquefaction zone, said gaseous feed containing a greater concentration of the more volatile component than the liquefied gas;
   (b) separating the gaseous feed from the liquefied gas, the liquefied gas now containing a reduced quantity of said more volatile component, and the gaseous feed now containing an increased quantity of said more volatile component;
   (c) recovering the liquefied gas from step (b) as the liquefied product of the liquefaction process;
   (d) introducing the gaseous feed into the liquefaction zone to condense a major portion thereof, said liquefied portion containing a smaller concentration of the more volatile component than present in the gas feed introduced into the liquefaction zone; and
   (e) passing substantially the entire liquefied portion from step (d) to step (a).

2. The process of claim 1 wherein the gaseous feed is primarily chlorine, containing quantities of carbon dioxide as a more volatile component and the liquefied product is chlorine.

3. The process of claim 2 wherein said gaseous feed is passed in countercurrent contact with said liquefied gas.

4. The process of claim 2 wherein said gaseous feed is passed in countercurrent contact with said liquefied gas, and wherein the liquefied gas from such contact is passed in countercurrent contact with reboiled vapors, and wherein said gaseous feed provides heat requirement for forming said reboiled vapors prior to contacting said liquefied gas.

5. The process as defined in claim 2 and further comprising withdrawing an uncondensed minor portion of the gaseous feed from the liquefaction zone and cooling said uncondensed minor portion to condense a portion thereof whereby additional liquefied gas is produced.

References Cited

UNITED STATES PATENTS

| | | | |
|---|---|---|---|
| 2,199,797 | 5/1940 | Hunter | 55—71 |
| 2,700,431 | 1/1955 | Sutter | 55—71 X |
| 2,765,873 | 10/1956 | Hulme | 55—71 X |
| 2,785,055 | 3/1957 | Redcay. | |
| 2,822,889 | 2/1958 | Sutter | 55—71 X |
| 2,868,325 | 1/1959 | Cathala | 55—71 X |

REUBEN FRIEDMAN, *Primary Examiner.*

J. A. DEE, *Assistant Examiner.*